US009446708B2

(12) United States Patent
Kasai

(10) Patent No.: US 9,446,708 B2
(45) Date of Patent: Sep. 20, 2016

(54) CONTROL APPARATUS FOR VEHICLE HEADLIGHT AND CONTROL METHOD FOR THE SAME

(71) Applicant: DENSO CORPORATION, Kariya, Aichi-pref. (JP)

(72) Inventor: Hajime Kasai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/426,427

(22) PCT Filed: Sep. 5, 2013

(86) PCT No.: PCT/JP2013/073985
§ 371 (c)(1),
(2) Date: Mar. 6, 2015

(87) PCT Pub. No.: WO2014/038637
PCT Pub. Date: Mar. 13, 2014

(65) Prior Publication Data
US 2015/0217677 A1 Aug. 6, 2015

(30) Foreign Application Priority Data
Sep. 7, 2012 (JP) ................................. 2012-197120

(51) Int. Cl.
*B60Q 1/08* (2006.01)
*B60Q 1/14* (2006.01)
(Continued)

(52) U.S. Cl.
CPC ................. *B60Q 1/08* (2013.01); *B60Q 1/143* (2013.01); *B60Q 2300/112* (2013.01); *B60Q 2300/332* (2013.01); *B60Q 2300/41* (2013.01); *B60Q 2300/42* (2013.01)

(58) Field of Classification Search
CPC .. B60Q 1/08; B60Q 1/143; B60Q 2300/112; B60Q 2300/332; B60Q 2300/41; B60Q 2300/42; B60Q 1/18; H05B 37/0227; H05B 37/0218
See application file for complete search history.

(56) References Cited

U.S. PATENT DOCUMENTS
6,293,686 B1* 9/2001 Hayami ................. B60Q 1/085
307/10.8
2001/0012206 A1* 8/2001 Hayami ................. B60Q 1/085
362/464
(Continued)

FOREIGN PATENT DOCUMENTS
EP 2266838 A1 12/2010
JP 2002193025 A 7/2002
(Continued)

OTHER PUBLICATIONS
International Search Report (in Japanese with English Translation) for PCT/JP2013/073985, mailed Oct. 22, 2013; ISA/JP.
(Continued)

*Primary Examiner* — Dale Moyer
(74) *Attorney, Agent, or Firm* — Harness, Dickey & Pierce, P.L.C.

(57) ABSTRACT
A distribution pattern of the vehicle headlight is transitioned according to a vehicle speed, between three light distribution patterns. The patterns are a normal mode corresponding to a light distribution variable control state, an OFF mode corresponding to a low-beam state, and a residential mode corresponding to a high-beam light distribution that does not give a glare to pedestrians. It is determined whether or not a detected vehicle speed is within a predetermined range that enables transition of the light distribution pattern to the residential mode, and it is determined whether or not an immediately-preceding execution state of the light distribution pattern has been the normal mode. Transition between modes of the light distribution pattern is prohibited when a detected vehicle speed is determined to be within a predetermined range, and the immediately-preceding execution state is determined to have been the normal mode.

3 Claims, 3 Drawing Sheets

(51) Int. Cl.
*B60Q 1/04* (2006.01)
*B60Q 1/06* (2006.01)

(56) References Cited

U.S. PATENT DOCUMENTS

| | | | |
|---|---|---|---|
| 2002/0080618 A1 | 6/2002 | Kobayashi et al. | |
| 2003/0123705 A1* | 7/2003 | Stam | B60Q 1/085 382/104 |
| 2006/0177098 A1* | 8/2006 | Stam | B60Q 1/085 382/104 |
| 2008/0007961 A1 | 1/2008 | Mochizuki et al. | |
| 2015/0246634 A1* | 9/2015 | Hall | B60Q 1/143 315/79 |

FOREIGN PATENT DOCUMENTS

| | | |
|---|---|---|
| JP | 2006021631 A | 1/2006 |
| JP | 2008013014 A | 1/2008 |
| JP | 2011005992 A | 1/2011 |

OTHER PUBLICATIONS

International Preliminary Report on Patentability (in Japanese with English Translation) for PCT/JP2013/073985, issued Mar. 10, 2015; ISA/JP.

Japan Institute for Promoting Invention and Innovation Technical Disclosure Bulletin No. 2012-501271; Mar. 23, 0212 (in Japanese with Partial English Translation).

* cited by examiner

CONTROL APPARATUS FOR VEHICLE HEADLIGHT AND CONTROL METHOD FOR THE SAME

CROSS REFERENCE TO RELATED APPLICATIONS

This application is a U.S. National Phase Application under 35 U.S.C. 371 of International Application No. PCT/JP2013/073985 filed on Sep. 5, 2013 and published in Japanese as WO 2014/038637 A1 on Mar. 13, 2014. This application is based on and claims the benefit of priority from Japanese Application No. 2012-197120 filed on Sep. 7, 2012. The entire disclosures of all of the above applications are incorporated herein by reference.

BACKGROUND

1. Technical Field

The present invention relates to a control apparatus for a vehicle headlight and a control method therefor, and in particular relates to a control apparatus for a vehicle headlight, which performs transition control over a light distribution pattern having a plurality of modes, and a control method therefor.

2. Background Art

Vehicle headlights in general are able to switch a beam from high to low, or vice versa. A low beam casts short-range light ahead of the vehicle, with a predetermined illuminance so that no glare is given to vehicles traveling ahead, including oncoming vehicles or preceding vehicles. Thus, a low beam is mainly used in travel in a residential area. On the other hand, a high beam illuminates a broad area and casts long-range light ahead of the vehicle, with a comparatively high illuminance. Thus, a high beam is mainly used on a road where only a few vehicles travel ahead. Compared to a low beam, a high beam promises better visibility to the driver but suffers from a problem of causing glare to the drivers of other vehicles. Accordingly, in many cases, a low beam is particularly used in night-time travel in an urban area. On the other hand, there is an implementation in which a beam mode is switched to a high-beam light distribution mode, in response to a need of improving a driver's visibility of a road in a low-beam state. Specifically, after analysis of image information obtained from an in-vehicle camera for acquisition of the surrounding illuminance or brightness, if the vehicle speed is less than a predetermined speed, with no vehicle being detected as traveling ahead, with a resultant determination that the area is a residential area, the beam mode is switched to the high-beam light distribution mode, as a residential mode, that does not cause glare to pedestrians.

Patent Literature 1 describes that a vehicle speed of not more than a predetermined speed is set as an antiglare speed range for pedestrians. According to the description, when a vehicle speed is in the antiglare speed range for pedestrians, the vehicle is determined to be traveling in a residential area, and the illuminance is lowered such as with a light distribution pattern for high beam.

Patent Literature 1 JP-A-2011-005992

Technical Problem

However, switching light distribution pattern of a vehicle headlight to a residential mode as mentioned above may be erroneously performed when the vehicle is not in a residential area, such as when the vehicle is in deceleration for a red light such as on a main road or when the vehicle is in acceleration when exiting from a parking lot to a road. Frequent switching of light distribution pattern is quite annoying.

SUMMARY

In light of the problem mentioned above, it is thus desired to provide a control apparatus for a vehicle headlight, which effectively suppresses transition of light distribution pattern of the vehicle headlight to a residential mode, and a control method therefor.

In order to achieve the above object, according to an exemplary embodiment, a control apparatus for a vehicle headlight is provided. The control apparatus performs transition control under which a light distribution pattern of the vehicle headlight is transitioned according to a detected vehicle speed which is calculated on the basis of a signal of a vehicle speed sensor. The light distribution pattern is transitioned between a normal mode corresponding to a light distribution variable control state, an OFF mode corresponding to a low-beam state, and a residential mode corresponding to a high-beam light distribution that is suitable for traveling in a residential area and gives no glare to pedestrians. The control apparatus includes: a vehicle speed determining unit determining whether or not the vehicle speed is within a predetermined range that enables transition of the light distribution pattern to the residential mode; and a control mode determining means for determining whether or not an immediately-preceding execution state of the light distribution pattern based on the transition control has been the normal mode. Mode transition of the light distribution pattern is configured to be prohibited when the vehicle speed determining unit determines that the detected vehicle speed is within the predetermined range, and the control mode determining unit determines that an immediately-preceding execution state of the light distribution pattern based on the transition control has been the normal mode.

According to another exemplary embodiment, a control apparatus for a vehicle headlight is provided. The control apparatus performs transition control under which a light distribution pattern of the vehicle headlight is transitioned according to a detected vehicle speed which is calculated on the basis of a signal of a vehicle speed sensor. The light distribution pattern is transitioned between a normal mode corresponding to a light distribution variable control state, an OFF mode corresponding to a low-beam state, and a residential mode corresponding to a high-beam light distribution that is suitable for traveling in a residential area and gives no glare to pedestrians. The control apparatus includes: a vehicle speed deceleration determining unit determining whether or not the detected vehicle speed is not more than a predetermined vehicle speed; and a continuation determining unit determining whether or not a determined state that is a state where the detected vehicle speed is not more than the predetermined vehicle speed, as derived from the vehicle speed deceleration determining unit, has continued for a predetermined duration of time. In the control apparatus, when the continuation determining unit determines that a determined state that is a state where the detected vehicle speed is not more than the predetermined vehicle speed, as derived from the vehicle speed deceleration determining means, has continued for a predetermined duration of time, the light distribution pattern of the vehicle headlight is subjected to transition control between the plurality of patterns including the normal mode and the residential mode, according to a detected vehicle speed which has been calculated on the basis of a signal of the vehicle speed sensor which is characterized in that the sensor transitions the light distribution pattern to the residential mode.

The control apparatus for the vehicle headlight and the control method therefor configured as described above has good advantageous effects of suppressing the unnecessary and frequent switching of light distribution mode and eliminating driver's annoyance.

DESCRIPTION OF EMBODIMENTS

Figure 1:
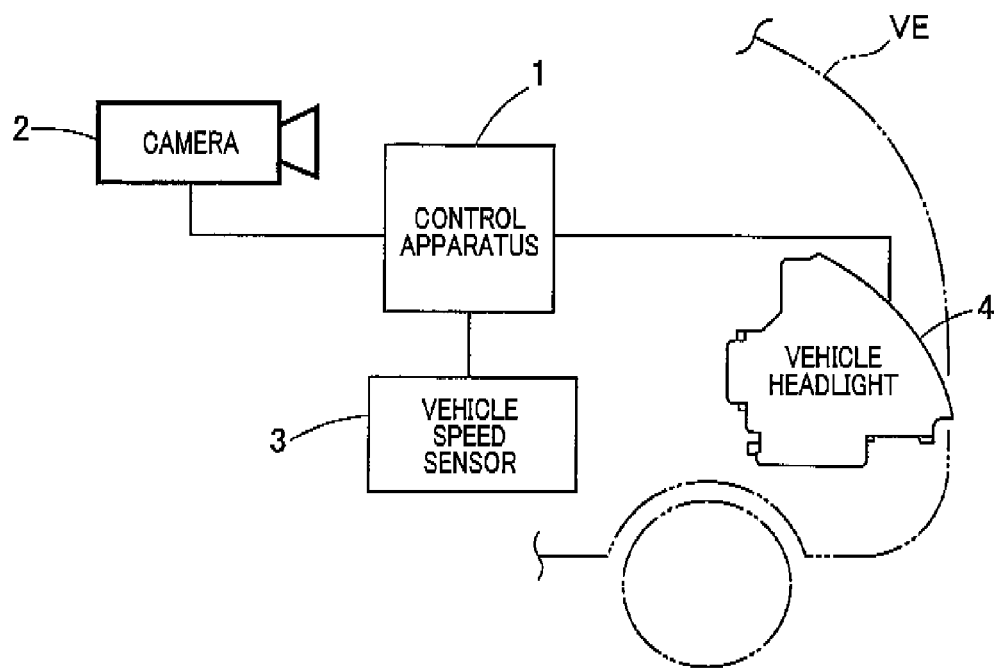
FIG. 1 is a block diagram illustrating a control apparatus used in embodiments of the present invention, and peripheral devices connected to the apparatus.
Figure 2:
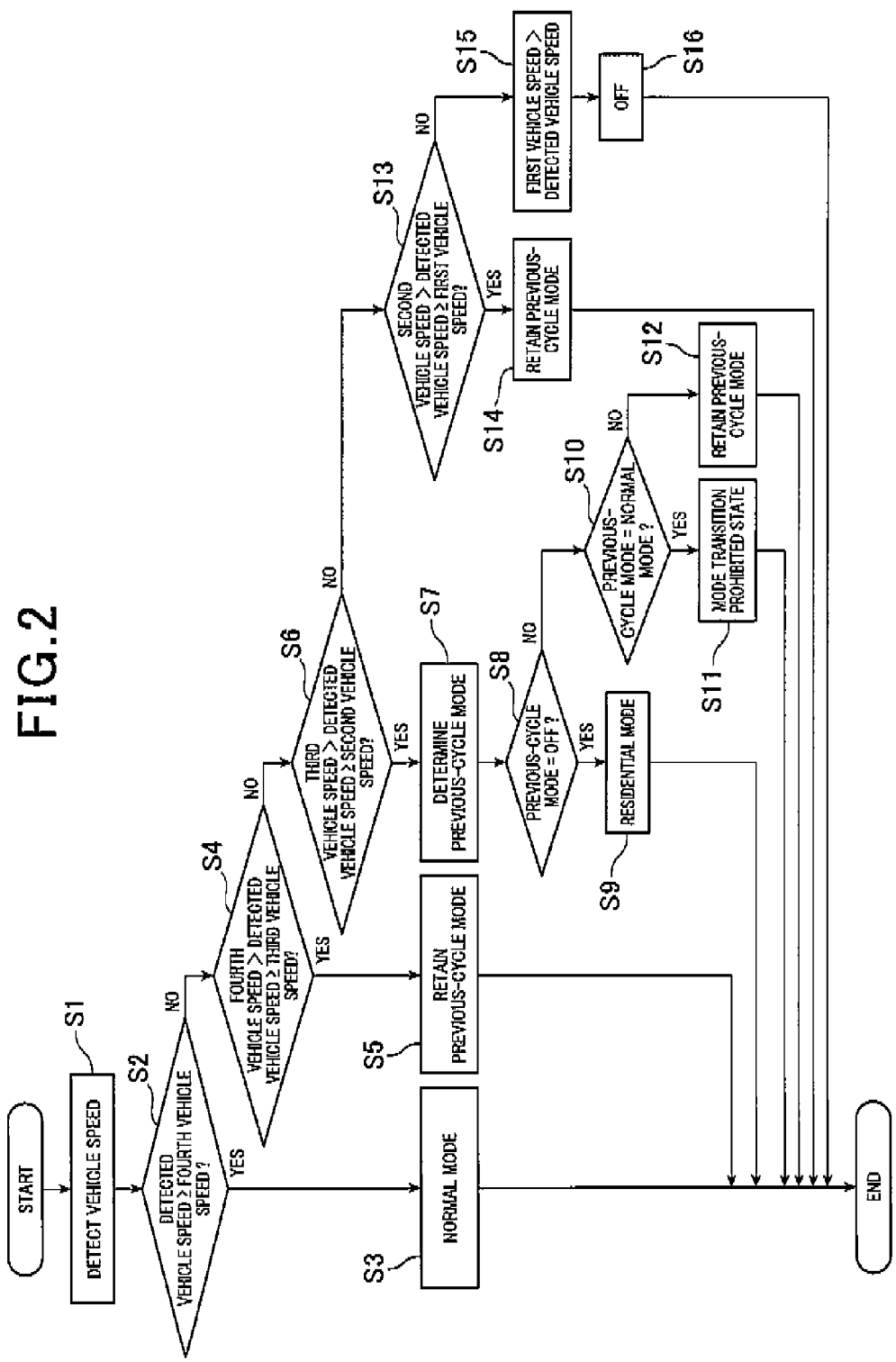
FIG. 2 is a flow diagram illustrating control performed in a first embodiment.

With reference to the accompanying drawings, hereinafter are described some embodiments of a control apparatus and a control method related to the present invention.

A control apparatus 1 is a device corresponding to an ECU (electronic control unit). The control unit 1 receives signals from a camera 2 and a vehicle speed sensor 3 and outputs the results of processing based on the signals to a vehicle headlight 4.

The camera 2 is a device that takes an image ahead of a vehicle VE, and is set up at a predetermined position in a vehicle interior, such as on a back side of a rearview mirror. As the camera 2 favorably used, mention can be made of a solid state imaging device, such as a well-known CCD image sensor, or a CMOS image sensor. An image pickup signal inputted to the control apparatus 1 is converted/generated into an image signal of persons and of vehicles present ahead, or a luminance and brightness signal.

The vehicle speed sensor 3 is mounted to a wheel and outputs a pulse according to the rotational speed of the wheel. The pulse is inputted to the control apparatus 1. The control apparatus 1 then processes the pulse to generate a detected vehicle speed.

The vehicle headlight 4 is configured by lamps including light sources which are constituted of low-beam filaments and high-beam filaments, or configured by a number of light sources, such as LEDs (light-emitting diodes). The vehicle headlight 4 is ensured to increase or decrease the amount of long-range illumination, by changing lighting pattern (e.g. the number or positions of the lamps or LEDs) of the light sources. A plurality of light distribution patterns are obtained by switching/selecting the light sources constituted of the filaments or LEDs. These light distribution patterns are stored in the control apparatus 1 as settings of the switching/selection. Transition between the light distribution patterns is carried out upon satisfaction of preset conditions on the basis such as of a detected vehicle speed, an image signal and a luminance signal.

The light distribution patterns are set as "normal mode", "OFF mode" and "residential mode". In the normal mode, all the light sources are in a light distribution variable control state to cast long-range light over a broad area ahead of the vehicle, with a comparatively high illuminance. Thus, the normal mode is used on a road where only a few vehicles travel ahead. In the OFF mode, all the lit light sources are in a low-beam state to cast short-range light with a predetermined illuminance so as not to glare vehicles traveling ahead, including oncoming vehicles or preceding vehicles, as well as pedestrians. The residential mode corresponds to high-beam light distribution that gives no glare to pedestrians. In the residential mode, light is distributed in such a way that the driver's visibility of a road is improved without giving a glare to the vehicles or pedestrians ahead of the vehicle, unlike high beam. The residential mode is created, for example, by mixing low-beam state light sources and high-beam state light sources. For example, in the residential mode, high-beam state light sources are variously switched/selected to lower the lighting illuminance, or the headlight on a pedestrian side is brought into a low-beam state, while the headlight on an opposite lane side is brought into a high-beam state. In any case, the residential mode is effectively used chiefly in travel in a residential area.

Figure 3:
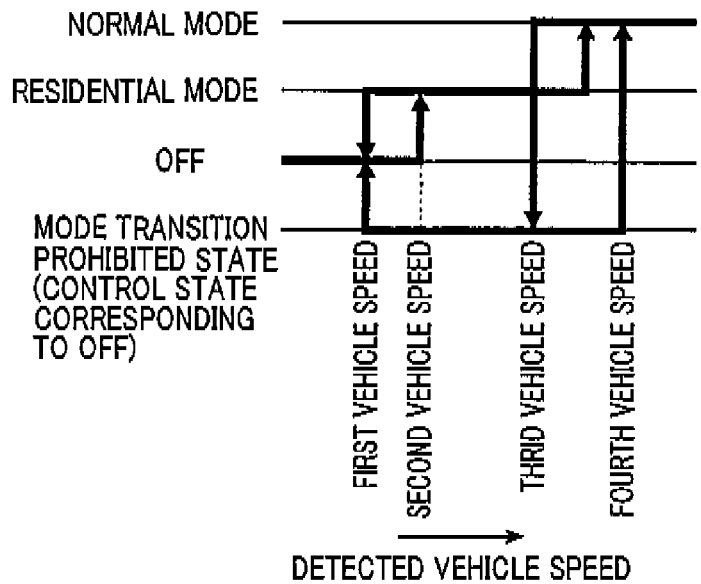
FIG. 3 is an explanatory diagram illustrating transition of control mode in the first embodiment.

Referring to a flow diagram illustrated in FIG. 3 and an explanatory diagram illustrated in FIG. 3, a first embodiment is described.

The control apparatus 1 calculates a detected vehicle speed on the basis of a vehicle speed signal detected by the vehicle speed sensor 3 (step S1). The control apparatus 1 performs a comparative calculation to determine whether or not the detected vehicle speed is higher than a predetermined fourth vehicle speed (30 km/h in the embodiment) (step S2). If the detected vehicle speed is determined to be higher than the fourth vehicle speed, the control apparatus 1 switches or selects the lamps or the LEDs of the vehicle headlight 4 on the basis of the stored settings to thereby turn the light distribution pattern to the normal mode (step S3).

If the detected vehicle speed is determined, at step S2, to be lower than the fourth vehicle speed, the control apparatus 1 performs a comparative calculation to determine whether or not the detected vehicle speed is higher than a predetermined third vehicle speed (25 km/h in the embodiment) (step S4). If the detected vehicle speed is determined to be higher than the third vehicle speed, the control apparatus 1 performs transition control under which an immediately-preceding (previous-cycle) light distribution pattern mode is retained (step S5).

If the detected vehicle speed is determined, at step S4, to be lower than the third vehicle speed, the control apparatus 1 performs a comparative calculation to determine whether or not the detected vehicle speed is higher than a predetermined second vehicle speed (18 km/h in the embodiment) (step S6). It should be noted that step S6 corresponds to the vehicle speed determining means for determining whether or not a detected vehicle speed is within a predetermined range. If the detected vehicle speed is determined to be higher than the second vehicle speed, the control apparatus 1 makes a determination as to what the immediately-preceding execution state was for the light distribution pattern resulting from the transition control (step S7).

The control apparatus 1 determines whether or not the immediately-preceding execution state of the light distribution pattern based on the transition control has been the OFF mode (step S8). If the immediately-preceding execution state of the light distribution pattern based on the transition control is determined to have been the OFF mode, the control apparatus 1 switches or selects the lamps or the LEDs of the vehicle headlight 4 on the basis of the stored settings to thereby turn the light distribution pattern to the residential mode (step S9). In this case, although not shown, information of the image or illuminance ahead of the vehicle acquired on the basis of the image pickup signal from the camera 2 may be used to determine whether or not transition to the residential mode should be carried out. In other words, the requirement that no vehicle or person is present ahead of the vehicle may be added to the conditions based on which transition to the residential mode is carried out.

If the immediately-preceding execution state of the light distribution pattern based on the transition control is determined not to have been the OFF mode, i.e. if the immediately-preceding execution state of the light distribution pattern based on the transition control has been the normal mode or the residential mode, the control apparatus 1 further determines whether or not the immediately-preceding execution state of the light distribution pattern based on the transition control has been the normal mode (step S10). Thus, steps S8 and S10 correspond to the control mode determining means for determining whether or not the immediately-preceding execution state of the light distribution pattern based on the transition control has been the normal mode.

The control apparatus 1 prohibits mode transmission of the light distribution pattern if the immediately-preceding execution state of the light distribution pattern based on the transition control has been the normal mode (step S11). If the immediately-preceding execution state of the light distribution pattern based on the transition control is determined, at step S10, to have been the residential mode, the control apparatus 1 performs control so as to retain the light distribution pattern mode of the immediately-preceding execution state of the light distribution pattern based on the transition control (step S12).

If the detected vehicle speed is determined, at step S6, to be lower than the second vehicle speed, the control apparatus 1 performs a comparative calculation to determine whether or not the detected vehicle speed is not less than a predetermined first vehicle speed (15 km/h in the embodiment) (step S13). If the detected vehicle speed is determined to be not less than the first vehicle speed, the control apparatus 1 performs control so as to retain the light distribution pattern mode of the immediately-preceding execution state of the light distribution pattern based on the transition control (step S14).

If the detected vehicle speed is determined, at step S13, to be lower than the first vehicle speed (step S15), the control apparatus 1 turns mode transition control of the light distribution pattern to the OFF mode (step S16).

Figure 4:
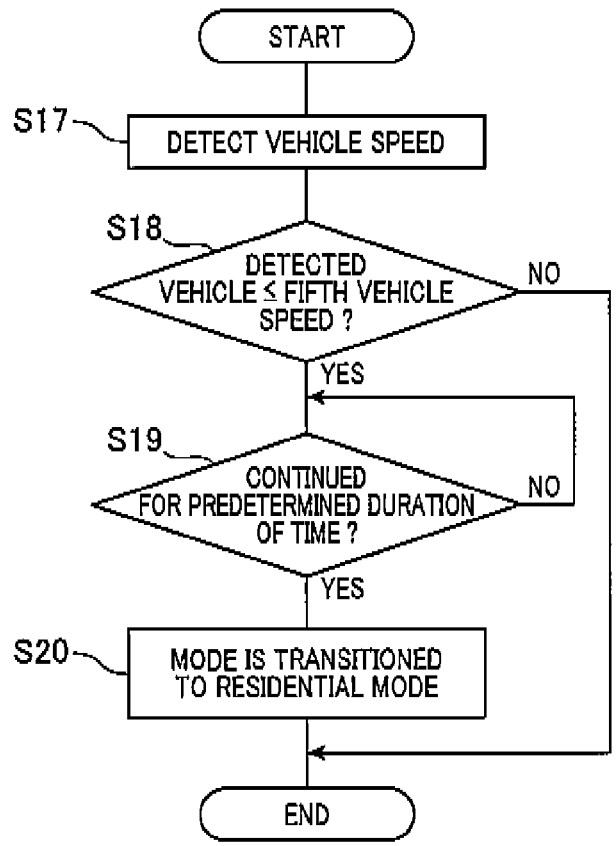
FIG. 4 is a flow diagram illustrating control performed in a second embodiment.

Referring to a flow diagram shown in FIG. 4, a second embodiment is described.

The control apparatus 1 calculates a detected vehicle speed on the basis of a vehicle speed signal detected by the vehicle speed sensor 3 (step S17). The control apparatus 1 performs a comparative calculation to determine whether or not the detected vehicle speed is not more than a predetermined fifth vehicle speed (30 km/h in the embodiment) (step S18). If the detected vehicle speed is not more than the fifth vehicle speed, the control apparatus 1 determines whether or not the state has continued for a predetermined duration of time (3 to 5 seconds in the embodiment) (step S19). If the detected vehicle speed is not more than the fifth vehicle state and the speed state has continued for the predetermined duration of time, the control apparatus 1 transitions the light distribution pattern to the residential mode (step S20). Thus, step S18 corresponds to the vehicle speed deceleration determining means for determining whether or not a detected vehicle speed is not more than a predetermined vehicle speed. Step S19 corresponds to the continuation determining means for determining whether or not a determined state, i.e. a state where a detected vehicle speed is not more than a predetermined vehicle speed, as derived from the vehicle speed deceleration determining means, has continued for a predetermined duration of time.

As is apparent from the detailed description provided above, according to the first embodiment, the control apparatus 1 includes the vehicle speed determining means for determining whether or not the detected vehicle speed is within a predetermined range which enables transition of the light distribution pattern to the residential mode (step S6), and the control mode determining means for determining whether or not an immediately-preceding execution state of the light distribution pattern based on the transition control has been the normal mode (steps S8 and S10). Mode transition of the light distribution pattern is prohibited if the vehicle speed determining means step determines the detected vehicle speed to be within the predetermined range, and if the control mode determining means determines the immediately-preceding execution state of the light distribution pattern based on the transition control to be the normal mode. Accordingly, mode transition is prohibited where the vehicle speed is at a level at which the light distribution pattern can be transitioned to the residential mode but yet the transition should not be performed, such as when the vehicle is in deceleration for a red light such as on a main road. Thus, there are good advantageous effects of suppressing unnecessary and frequent transition of the light distribution mode, and eliminating annoyance of the driver.

Further, the determination as to whether or not transition to the residential mode should be made is based on the information of the image and illuminance ahead of the vehicle acquired based on an image pickup signal from the camera 2. Accordingly, transition to the residential mode can be more properly performed.

Further, according to the second embodiment, the control apparatus 1 includes the vehicle speed deceleration determining means for determining whether or not a detected vehicle speed is not more than a predetermined vehicle speed (step S18), and the continuation determining means for determining whether or not a determined state, i.e. a state where the detected vehicle speed is not more than a predetermined vehicle speed, as derived from the vehicle speed deceleration determining means, has continued for a predetermined duration of time (step S19). The light distribution pattern is transitioned to the residential mode if the continuation determining means determines that the determined state, i.e. the state where the detected vehicle speed is not more than the predetermined vehicle speed, as derived from the vehicle speed deceleration determining means, has continued for a predetermined duration of time. Accordingly, an erroneous transition to the residential mode can be prevented, which would otherwise have been caused in a short duration of time when the vehicle is in acceleration in a low-speed range where transition to the residential mode should be performed, such as when the vehicle is in acceleration in exiting from a parking lot of a residential area to a road. Thus, there are good advantageous effects of suppressing unnecessary and frequent transition of the light distribution mode, and eliminating annoyance of the driver.

The present invention should be construed as including any mode that can be implemented by adding various changes, modifications, improvements and the like, on the basis of the knowledge of a skilled artisan. Further, as a matter of course, any mode of implementation with the addition of the changes and the like should also be construed as being included in the scope of the present invention, as far as the mode does not depart from the spirit of the present invention.

R
- 1 Control apparatus
- 2 Camera
- 3 Vehicle sensor
- 4 Vehicle headlight
- S6 Vehicle speed determining means
- S8, S10 Control mode determining means
- S18 Vehicle speed deceleration determining means
- S19 Continuation determining means

What is claimed is:

1. A control apparatus for a vehicle headlight, the apparatus performing transition control under which a light distribution pattern of the vehicle headlight is transitioned according to a vehicle speed, between three light distribution patterns which are a normal mode corresponding to a light distribution variable control state, an OFF mode corresponding to a low-beam state, and a residential mode corresponding to a high-beam light distribution that is suitable for traveling in a residential area and causes no glare to pedestrians, the apparatus comprising:
   a vehicle speed determining means for determining whether or not the vehicle speed is within a predetermined range that enables transition of the light distribution pattern to the residential mode;
   a control mode determining means for determining whether or not an immediately-preceding execution state of the light distribution pattern based on the transition control was the normal mode; and
   a transition prohibiting means for prohibiting mode transition of the light distribution pattern when the vehicle speed determining means determines that the vehicle speed is within the predetermined range, and the control mode determining means determines that an immediately-preceding execution state of the light distribution pattern based on the transition control was the normal mode.

2. The control apparatus for a vehicle headlight, according to claim 1, wherein:
   the apparatus comprises a transition determining means for determining whether or not the light distribution pattern should be transitioned to the residential mode; and
   the transition determining means makes the determination on the basis of information of an image and an illuminance ahead of the vehicle acquired on the basis of an image pickup signal of the camera.

3. A control method for a vehicle headlight, the method performing transition control under which light distribution pattern of the vehicle headlight is transitioned according to a vehicle speed, between three light distribution patterns which are a normal mode corresponding to a light distribution variable control state, an OFF mode corresponding to a low-beam state, and a residential mode corresponding to a high-beam light distribution that is suitable for traveling in a residential area and gives no glare to pedestrians, the method comprising:
   determining whether or not the vehicle speed is within a predetermined range that enables transition of the light distribution pattern to the residential mode;
   determining whether or not an immediately-preceding execution state of the light distribution pattern based on the transition control has been the normal mode; and
   prohibiting mode transition of the light distribution pattern when the vehicle speed is determined to be within the predetermined range, and an immediately-preceding execution state of the light distribution pattern based on the transition control is determined to have been the normal mode.

* * * * *